United States Patent
Reschke et al.

(10) Patent No.: US 11,130,502 B2
(45) Date of Patent: Sep. 28, 2021

(54) METHOD FOR ASSISTING A DRIVER WITH REGARD TO TRAFFIC-SITUATION-RELEVANT OBJECTS AND MOTOR VEHICLE

(71) Applicant: AUDI AG, Ingolstadt (DE)

(72) Inventors: Johannes Reschke, Langquaid (DE); Stefanie Schmidtner, Beilngries (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/898,740

(22) Filed: Jun. 11, 2020

(65) Prior Publication Data
US 2020/0391760 A1 Dec. 17, 2020

(30) Foreign Application Priority Data
Jun. 14, 2019 (DE) .......................... 102019208663.2

(51) Int. Cl.
*B60W 50/14* (2020.01)
*B60W 40/08* (2012.01)
(Continued)

(52) U.S. Cl.
CPC .............. *B60W 50/14* (2013.01); *B60Q 1/525* (2013.01); *B60W 40/04* (2013.01); *B60W 40/08* (2013.01);
(Continued)

(58) Field of Classification Search
CPC ...... B60W 50/14; B60W 40/04; B60W 40/08; B60W 2540/225; B60W 2050/143; G06K 9/00805; G06K 9/6267; B60Q 1/525
See application file for complete search history.

(56) References Cited

U.S. PATENT DOCUMENTS

2011/0090093 A1* 4/2011 Grimm ................. G08G 1/162
340/901
2012/0182425 A1* 7/2012 Higgins-Luthman ........................
B60Q 1/245
348/148
(Continued)

FOREIGN PATENT DOCUMENTS

DE 102013217405 A1 3/2014
DE 102013206739 A1 10/2014
(Continued)

*Primary Examiner* — Mohamed Barakat
(74) *Attorney, Agent, or Firm* — Sterne, Kessler, Goldstein & Fox P.L.L.C.

(57) ABSTRACT

A method is provided for assisting a driver of a motor vehicle in a traffic situation with regard to objects relevant to the traffic situation. The motor vehicle has at least one environment sensor directed towards the forefield of the motor vehicle, at least one driver sensor designed to detect the line of sight and fixation of the driver's eyes, and at least one headlight having a controllably variable spatial illumination pattern. The method includes detecting, classifying, and locating objects in the forefield of the motor vehicle to determine a first object list having the object data associated with the detected objects. The method also includes determining objects, which were detected and not detected by the driver, in order to generate a second object list of undetected objects. The method also includes illuminating the at least one illuminated object in a targeted manner using the at least one headlight to notify the driver about the illuminated object.

20 Claims, 2 Drawing Sheets

(51) Int. Cl.
    *B60Q 1/52* (2006.01)
    *G06K 9/62* (2006.01)
    *B60W 40/04* (2006.01)
    *G06K 9/00* (2006.01)

(52) U.S. Cl.
    CPC ....... *G06K 9/00805* (2013.01); *G06K 9/6267* (2013.01); *B60W 2050/143* (2013.01); *B60W 2540/225* (2020.02)

(56) References Cited

U.S. PATENT DOCUMENTS

| | | |
|---|---|---|
| 2014/0070934 A1 | 3/2014 | Chau et al. |
| 2016/0152173 A1* | 6/2016 | Mayer .................. B60Q 1/1438 362/466 |
| 2019/0143967 A1* | 5/2019 | Kutila .................. G05D 1/0257 701/23 |

FOREIGN PATENT DOCUMENTS

| | | |
|---|---|---|
| DE | 102015225410 A1 | 6/2017 |
| DE | 102016001692 A1 | 8/2017 |
| DE | 102016201939 A1 | 8/2017 |

\* cited by examiner

FIG. 1

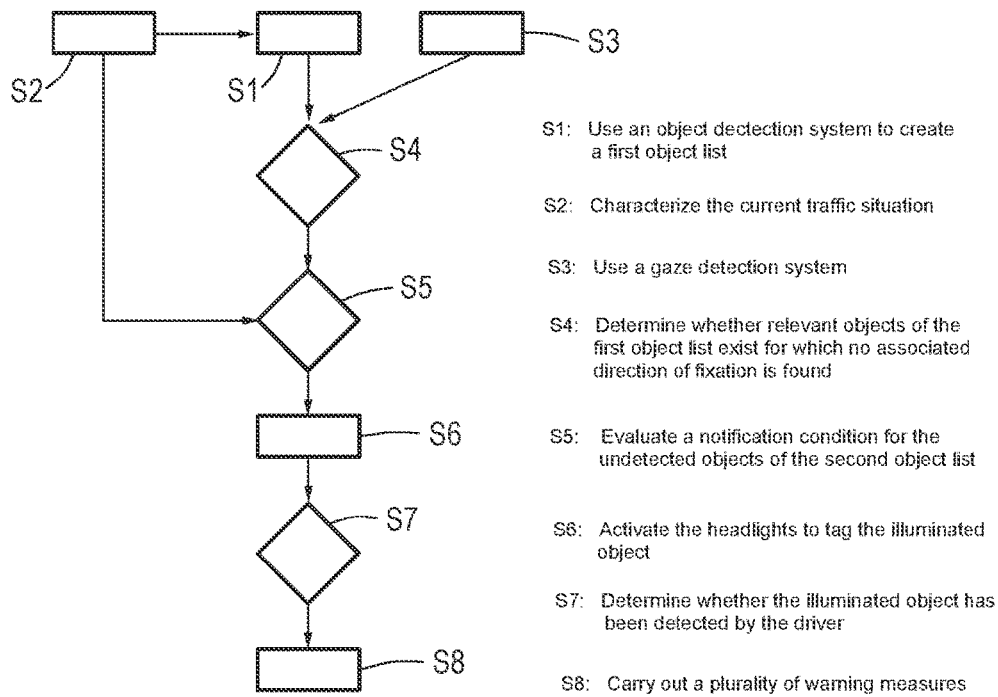

S1: Use an object dectection system to create a first object list

S2: Characterize the current traffic situation

S3: Use a gaze detection system

S4: Determine whether relevant objects of the first object list exist for which no associated direction of fixation is found S5: Evaluate a notification condition for the undetected objects of the second object list S6: Activate the headlights to tag the illuminated object S7: Determine whether the illuminated object has been detected by the driver S8: Carry out a plurality of warning measures

FIG. 2

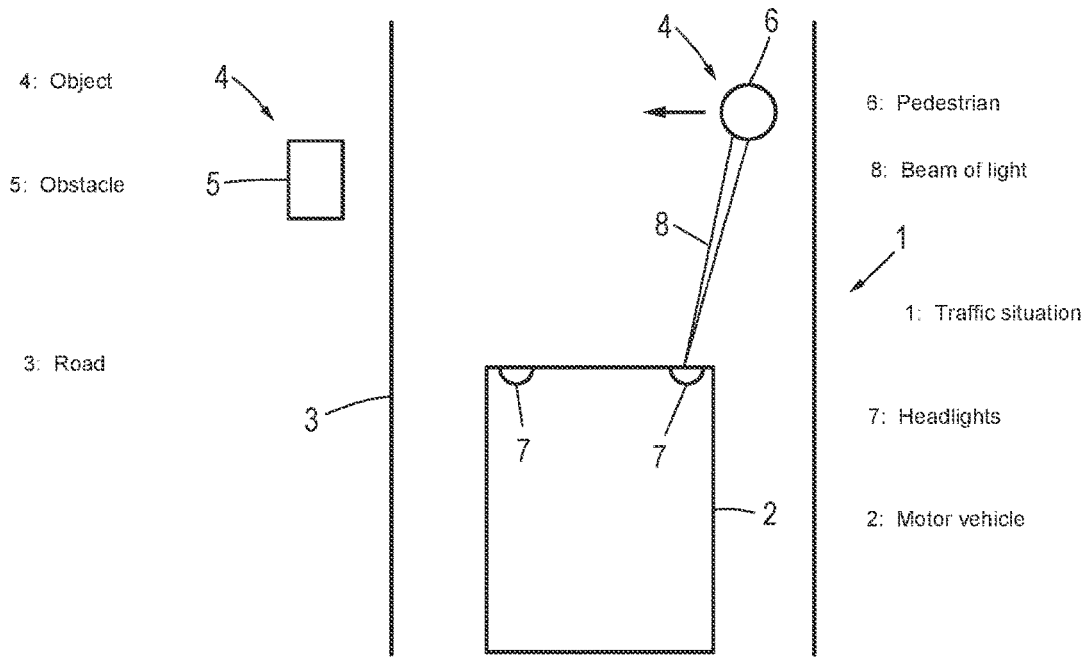

4: Object

5: Obstacle

3: Road

6: Pedestrian

8: Beam of light

1: Traffic situation

7: Headlights

2: Motor vehicle

2: Motor vehicle

7: Headlights

9: Headlight control unit

10: Environment sensors

11: Radar sensors

12: Camera

13: Driver sensors

14: Driver observation camera

15: Eye tracker

16: Driver assistance system or assisting system

17: Contol device

METHOD FOR ASSISTING A DRIVER WITH REGARD TO TRAFFIC-SITUATION-RELEVANT OBJECTS AND MOTOR VEHICLE

TECHNICAL FIELD

The invention relates to a method for assisting a driver of a motor vehicle in a traffic situation with regard to objects relevant to the traffic situation, where the motor vehicle has at least one environment sensor directed towards the forefield of the motor vehicle, at least one driver sensor designed to detect the line of sight and fixation of the driver's eyes, and at least one headlight having a controllably variable spatial illumination pattern. The invention also relates to a motor vehicle.

BACKGROUND

Vehicle systems in modern motor vehicles have increasingly higher performance capabilities and improved functionalities that can be used to make driving operations more comfortable and safer for the driver. For example, environment sensor systems of modern motor vehicles, which can include the most varied types of sensors, are able to detect, locate, and classify various objects in the surroundings of motor vehicles by evaluating the sensor data and in particular also sensor data fusions, and, if appropriate, collect further object data on these objects, for example in the case of other road users, their speeds, accelerations and the like. Examples of environment sensors currently used in motor vehicles include cameras, radar sensors, lidar sensors, laser scanners, ultrasonic sensors, and the like. For motor vehicles, it is also known to use sensors within the motor vehicle, for example driver sensors, which can monitor, for example, the state of the driver, his attention, and his gaze behavior.

Progress has also been made in providing notifications inside and outside the motor vehicle. For example, in addition to head-up displays (HUD), which allow information to be displayed in the driver's field of vision regarding the traffic situation, headlights having an adaptable spatial illumination pattern have also been proposed. Headlight systems of this type, which in two-wheel or multi-wheel motor vehicles usually include two headlights, use, for example, micromirror arrangements and/or individually controllable light sources, in particular LEDs, and/or controllable liquid crystal masks in order to be able to adapt the illumination pattern to the situation, for example to exclude drivers of other road users from the illumination pattern to avoid dazzling. The illumination region or the illumination pattern is usually subdivided into so-called headlight pixels, which can be individually controlled by means of a corresponding headlight control unit. In this way it is also possible to project specific images, for example for information purposes, onto the surface and/or onto walls or the like. For example, it is also possible to illuminate curve regions.

With regard to safety within the motor vehicle, the overlooking of objects in the surroundings of the motor vehicle, for example obstacles, signs, people, animals, other road users, and the like, is a relevant factor. A large number of these objects can indeed be detected by the modern environment sensor systems of motor vehicles mentioned, but this can only bring added value in cases in which the driver is completely responsible for guiding the vehicle, for example by emergency braking actions or the like. In particular in less critical situations, a motor vehicle-external object that is overlooked can result in general misconduct which inevitably cannot be predicted by security systems. This can result in an increased risk of accidents.

DE 10 2013 217 405 A1 proposes methods and systems for monitoring an object detection by a driver. It is proposed to receive external sensor data, which represent a scene outside the vehicle, and internal sensor data, which represent an image of the driver. On the basis of the external and internal sensor data, it is determined whether the driver has detected the item or object, where a control signal is optionally generated in order to control a head-up system which graphically reproduces the object on a windshield of the vehicle. The internal sensor data are evaluated to determine a driver's field of vision. It is concluded that the driver has not seen an object if the object is not in the driver's field of vision.

In other words, it is proposed there to display all objects in the head-up display, and possibly in different colors, regardless of the relevance of these objects. A head-up display is an unfavorable variant for attracting attention, since the driver's gaze is usually only restrictedly directed onto objects projected onto his windshield, possibly without the driver being able to detect them clearly. Furthermore, the fact that an object is in the driver's field of vision does not yet ensure that the driver actually detected the object, perceived it, and took it into account in his considerations for driving the vehicle. There is still a clear need for improvement.

DE 10 2013 206 739 A1 relates to a method for determining whether an occupant of a vehicle notices relevant objects in the surroundings of the vehicle. For this purpose, descriptions of objects in the surroundings of the vehicle, which were detected by means of an environment sensor system of the vehicle, are received and relevant objects in the surroundings of the vehicle are determined. At the same time, recordings of a camera that is mounted on a wearable device, in particular glasses, are received, where it is determined whether the relevant objects in the surroundings of the vehicle are also present in the recordings of the camera. A notification or warning can be output if a relevant object has not been noticed. The notification is also output via the wearable device, possibly also acoustically, and indicates the direction of the object.

However, such a wearable device, in particular glasses, is not conducive to driver comfort. It is also a prerequisite for correctly outputting the notifications that the wearable device is also correctly arranged on the driver's head. Here, too, there is still a clear need for improvement.

DE 10 2016 201 939 A1 relates to a device, a method, and a computer program for improving perception in collision avoidance systems. A sudden increase in driver attention can be registered by suitable sensors. Since an associated line of sight of the driver can additionally be detected by means of sensors, the information captured by the driver can be taken into account during the determination of a dangerous situation, in particular an object can be detected and the existence certainty thereof can be verified. Interventions in the driving behavior of the vehicle or warning measures for the driver can only be justified if the existence of the objects is sufficiently certain. The driver's line of sight is therefore used here to detect specific objects in a targeted manner that the driver has detected.

BRIEF DESCRIPTION OF THE DRAWINGS/FIGURES

FIG. 1 illustrates a schematic flow chart of a method, according to some embodiments of this disclosure.

FIG. 2 illustrates a schematic drawing for illuminating an illuminated object, according to some embodiments of this disclosure.

DETAILED DESCRIPTION

Figure 3:
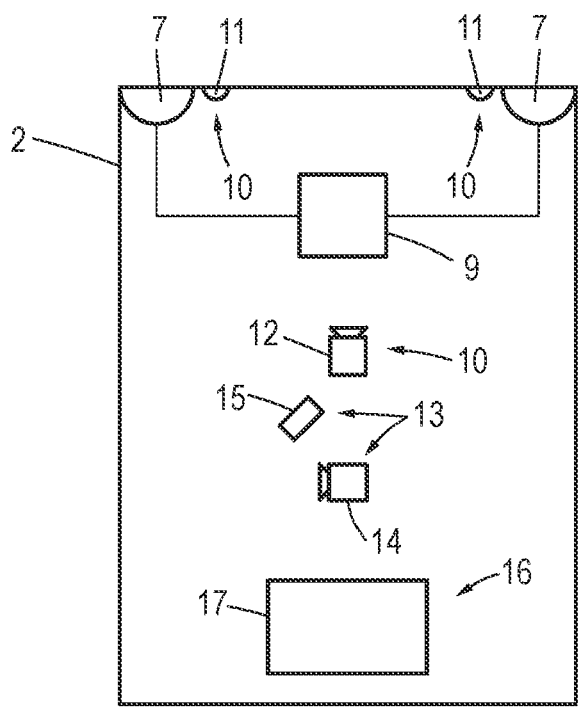
FIG. 3 illustrates a schematic diagram of a motor vehicle, according to some embodiments of this disclosure.

The invention is therefore based on the object of providing a possibility for improved assistance for the driver in the detection of objects in the vicinity of the motor vehicle, in particular in the forefield of the motor vehicle.

To achieve this object, the following steps are provided according to the invention in a method of the type mentioned at the outset:
- detecting and classifying, and locating objects in the forefield of the motor vehicle in sensor data of the at least one environment sensor to determine a first object list having the object data associated with the detected objects,
- determining objects detected and not detected by the driver by comparing the first object list with directions of fixation determined from the sensor data of the driver sensor in order to generate a second object list of undetected objects,
- when a notification condition for at least one illuminated object in the second object list is met, illuminating the at least one illuminated object in a targeted manner by means of the at least one headlight to notify the driver about the illuminated object.

According to the invention, object detection is therefore also initially carried out to detect objects, in particular in the forefield of the motor vehicle, using environment sensors or by evaluating the sensor data thereof, in order to obtain information about objects present there, into the first object list. The first object list can, for example, also be in the form of a particularly object-oriented surroundings map of the motor vehicle, as is fundamentally known in the prior art. A large number of different environment sensors can be used in the context of the present invention. For example, a camera and/or a radar sensor, and/or a lidar sensor, and/or a laser scanner, and/or an ultrasonic sensor can be used as the at least one environment sensor, where these different types of sensors can of course also be provided in a plurality, for example with regard to radar sensors. 360° coverage of the surroundings can also be achieved by the environment sensors of the motor vehicle. By means of fundamentally known evaluation techniques, in particular sensor data fusion, and/or general information fusion, and/or the use of further information, for example map data in relation to the current geoposition of the motor vehicle, objects can be detected, classified and located from the sensor data, for example in a coordinate system which is generally used for the motor vehicle and/or also as neo coordinates. The object class, the object position, which can also include an orientation, and possibly further information are assigned to the objects in the first object list as object data. At this point, it should also be pointed out that a communication device, in particular for motor vehicle-to-motor vehicle or motor vehicle-to-infrastructure communication, can also be regarded as an environment sensor if it provides sensor data and/or environment information that can be understood as sensor data. Such object detection systems are already known in principle in the prior art and are therefore not to be explained in detail here. Objects in the first object list can be, for example, traffic signs, pedestrians, obstacles, other road users, and the like.

As has been explained, the object data can at least partially contain more information than the position and the object class. For example, it can be provided that meaning information is determined for at least one of the objects in the first object list as object data. This can be useful, for example, if a traffic sign has been detected as an object, since then its meaning content, for example using suitable traffic sign detection algorithms, can also be determined. It can further be provided that a relative speed or an acceleration of the object is determined as object data for at least one of the objects in the first object list. Such information can easily be ascertained, for example, in the case of radar sensors as environment sensors and in particular allow the distinction between static and dynamic objects, in particular other specific road users.

The current traffic situation plays an important role in the context of the present invention, in particular with regard to the notification condition since the meaning of overlooked objects with regard to the traffic situation can ultimately be assessed on the basis of the notification condition. It can be provided that for the characterization of the traffic situation, in particular for the determination of traffic situation data, for example for the evaluation with regard to the relevance of objects and/or for the evaluation of the notification condition, map material present in the motor vehicle, in particular a navigation system, and/or current dynamic data of the motor vehicle and/or current environment condition information is used. It is therefore expedient to use a wide variety of further information sources which also characterize the traffic situation in the context of the present invention. For example, it can be assumed that the current driving behavior of the motor vehicle, and thus current dynamic data, is known via corresponding sensors, for example also ego sensors, and/or that information about the environment and traffic conditions, for example signs, speed limits, crosswalks, road conditions, are known from map data and the like. Current environment condition information can also relate, for example, to a class of the surroundings traveled through, for example urban, non-urban, motorway and the like, and/or the current traffic flow.

The driver sensor can expediently include a so-called eye tracker and/or a driver observation camera. According to some aspects of this disclosure, by evaluating the sensor data of the at least one driver sensor, not only the general field of vision of the driver is detected, but actually a direction of fixation is detected. Because when observing the traffic situation, an object in the forefield of the motor vehicle is not detected by the driver's gaze, but by conscious perception, for which the object is fixated at least for a short period of time. This fixation can also be determined in sensor data of modern driver sensors, such that along with the current line of sight there is a direction of fixation in which something is located that was in fact detected by the driver. Concrete algorithms for determining such a direction of fixation have already been proposed in various contexts and therefore do not have to be explained in detail here. In this context, however, it is particularly advantageous if an evaluation algorithm of artificial intelligence is used to determine the direction of fixation from the sensor data of the at least one driver sensor, since training data can easily be detected for the gaze behavior of a person and can be used to train the evaluation algorithm through machine learning. The line of sight and fixation direction analysis has proven to be particularly accessible to analysis using methods of artificial intelligence.

The first object list and the determined directions of fixation are compared with one another in order to determine which objects were consciously perceived by the driver, that is to say were detected, and which objects were not consciously perceived by the driver, and therefore were not detected. In other words, a comparison is made from the object detection and the gaze detection to the extent to which objects have been detected by the driver. Since the directions of fixation are in the same coordinate system as the positions and, if applicable, orientations of the objects in the first object list, such an adjustment is easily possible, where concealments or partial concealments can also be taken into account.

If objects are overlooked by the driver, i.e. the second object list is not empty, the driver's attention is directed according to the invention by means of the at least one headlight, in particular the two front headlights, to at least one selected undetected object, the at least one illuminated object, of the second object list, if the notification condition is met accordingly. The notification condition substantially serves to check to what extent there is sufficient criticality to notify the driver about the undetected object, so that it can be avoided that the driver is notified about a large number of undetected objects, when their non-detection only impairs driving safety to a small extent or is not substantial for other reasons, as will be explained below.

By illuminating the illuminated object, the driver's attention is drawn to it in a natural, intuitive manner. It is particularly preferred if the at least one headlight is triggered to illuminate the illuminated object multiple times, for example three times, briefly and in a flash-like manner within a specific period of time, for example from 0.5 to 1.5 seconds. Such short flashes of light are particularly suitable for reliably directing the driver's attention to the illuminated object. In the context of the present invention, it is preferred in any case to illuminate a plurality of illuminated objects in succession so that the driver can consciously perceive them in succession and is not torn between two illuminated objects. For example, a tagging illumination function of the at least one headlight can be used for illumination. The illumination is preferably carried out according to the invention in such a way that no glare or other distraction occurs, for example, in the case of a pedestrian, an animal, and/or a vehicle having a driver as an object. This means that the illumination in particular takes place in regions where there are no eyes.

Overall, the procedure according to the invention makes it possible to reduce or prevent accidents and misconduct by drivers due to overlooked objects, for example overlooked signs, pedestrians, and/or other objects, outside the vehicle and to increase the safety of vehicle users and other road users. In particular, the reliability of the detection of overlooked objects is increased by the detection of the direction of fixation, as is the reliability of directing the driver's attention to the object by using the at least one headlight, in particular the two headlights of a car or truck. With the present invention, drivers experience a higher level of safety and assistance when driving in complex driving situations.

The at least one headlight can in particular be a high-resolution headlight, in particular a high-resolution LED headlight. The illumination region is preferably divided into at least 1000, in particular at least 1,000,000, individually controllable pixels.

A list of the directions of fixation is expediently kept over a sliding time window. In this way, there is therefore a comparison that relates to objects that the driver consciously perceives in a relevant period of time. For example, the length of the time window can be 5 to 15 seconds. It is also conceivable to adapt the length of the time window dynamically, for example on the basis of a criticality of the traffic situation and/or a current speed of the motor vehicle. The criticality of the traffic situation can be described, for example, by collision probabilities, which are supplied by safety systems of the motor vehicle, lighting conditions, and the like. In this expedient refinement, it is ultimately determined in the comparison whether the objects of the first object list were also consciously perceived by the driver within a relevant time window.

Preferably, a relevance criterion that classifies the objects as relevant or not relevant to the traffic situation, in particular using artificial intelligence, is applied to the objects of the first object list, where only objects classified as relevant for the determination of the second object list and/or for the determination of the part of the objects to be illuminated are used. Using modern environment sensor systems in motor vehicles, it is often possible to detect a large number of different objects in the surroundings of the motor vehicle, in the present case in particular in the forefield of the motor vehicle. By reducing this number of detected objects to objects that are actually relevant for the traffic situation, the computation effort within the scope of the present invention is significantly reduced and the robustness and reliability of the assisting system described here is significantly increased. Relevant objects can be, for example, those with which the motor vehicle could collide or otherwise interact within the traffic situation and/or objects that can influence the driving behavior of the driver in the traffic situation, for example traffic signs, traffic lights, pedestrians waiting at a crosswalk, bumps, and the like. Relevance algorithms of artificial intelligence can also be used to determine the relevance of objects, since machine learning has proven to be a useful tool for assessing the relevance of detected objects.

In a particularly advantageous embodiment of the present invention, it can be provided that for at least some of the undetected objects in the second object list, priority information relating to the traffic situation is determined, taking into account traffic situation data describing the traffic situation and the respective object data, where the notification condition evaluates the priority information. At this point, it should also be noted that the number of undetected objects in the second object list, particularly when using a relevance criterion, will often be rather small anyway, which applies even more to the illuminated objects in the second object list that fulfill the notification condition, particularly when the driver is attentive. This means that in many cases the notification condition will select an object as an illuminated object; in rare cases, there may be a plurality of illuminated objects, for example two to four illuminated objects. The priority information can include a priority value, such that the selection can be made, for example, on the basis of a threshold value for the priority value. In exemplary embodiments, the threshold value can also be dynamically selectable, for example depending on the criticality of the traffic situation, in particular a collision probability and the like, but it is of course also possible that such criticality of the traffic situation is already included in the priority value itself. A dynamically selectable threshold value can also be based on a maximum number of illuminated objects to be selected.

In the case of a plurality of illuminated objects, an illumination sequence of the part of the objects is expediently determined as a function of the priority information, whereupon the objects of the second object list determined as part of the illumination sequence according to the illumination sequence are illuminated in succession, in particular for a predetermined time period and/or intermittently. As already mentioned, intermittent illumination can take place, for example, in the form of spaced, short flashes of light on the illuminated object. The successive lighting of illuminated objects gives the driver the opportunity to consciously perceive each of the illuminated objects individually, without causing irritation. As stated, for example, the predetermined period of time can be, for example, 0.5 to 1.5 seconds.

In a particularly advantageous development of the present invention, it can be provided that an analysis algorithm of artificial intelligence is used to evaluate the notification condition, in particular to determine the priority information, and/or the notification condition evaluates the traffic situation data describing the traffic situation, in particular the complexity of the traffic situation, and/or at least one hazard potential of at least one of the undetected objects, for example a collision probability, and/or the object data of the undetected objects. In this context, it is also particularly expedient if a traffic situation and/or object-related, available response time, in particular depending on the complexity of the traffic situation, and/or a speed of the motor vehicle and/or at least one object, is determined and evaluated in the context of the notification condition. In other words, if objects were overlooked by the driver, these illuminated objects are selected on the basis of their safety relevance and the meaningfulness of directing the attention to these objects. The available reaction time, which can be determined, for example, depending on the complexity of the driving situation, the speed of the motor vehicle, and the objects, substantially indicates how much time the driver has left regarding an overlooked object, to sensibly perceive it in the sense that he is still able to react to it and initiate an appropriate reaction, for example to increase security. If, for example, a potential collision object is overlooked, it only makes sense to illuminate it or illuminate it later in the sequence if the driver can consciously perceive it in the time remaining until the potential collision and can react appropriately. The use of an available response time is therefore a particularly expedient embodiment. Further assessment aspects in the context of the notification condition can already be assessed on the basis of the object data, for example with regard to the type of objects, the position of the objects, the speed of the objects, and the like. The safety relevance is also preferably taken into account. In a preferred embodiment, the notification condition therefore selects which objects of the second object list and, if appropriate, in which order they should be illuminated, depending on the security criticality and the available reaction time. Artificial intelligence, in the present case in the form of the analysis algorithm, can also expediently be used in this context. The analysis algorithm can be trained, for example, based on training data from detected objects, map data, and driver behavior.

A particularly preferred development of the present invention provides that at least one object of the object list to be evaluated based on historical information describing the viewing of at least one static object of the objects in a journey of the current route of the motor vehicle in the past by the driver is identified as known or as unknown to the driver, as part of the evaluation of the relevance criterion and/or as part of the evaluation of the notification condition, whereby objects identified as known to the driver, in particular by evaluating an additional condition, are classified as irrelevant or are excluded as an illuminated object. This configuration is based on the knowledge that some drivers no longer have to perceive facts already known to them in a targeted manner. For example, if a driver regularly drives the same route and knows that there is a specific speed limit on a portion of the route, he will no longer consciously notice the corresponding traffic sign because he already has the associated information. Obstacles may also already be known to a driver so that he no longer has to analyze them precisely, but ultimately knows how to avoid them without consciously noticing them. It can be expediently provided that the history information is determined using history data from past determinations of the second object list and/or using machine learning. The own results can also be used for the evaluation thereof. An additional condition in this context can be, for example, that the driver should actually still know that an object is present, that precisely this object represents a danger, for example if there is a particularly high collision probability with an obstacle or the like that is actually known, such that it may nevertheless be useful to inform the driver of said obstacle.

A further, particularly advantageous embodiment in this context provides that, in the context of evaluating the relevance criterion and/or in the context of evaluating the notification condition, at least one object of the object list to be evaluated by means of a context algorithm, in particular artificial intelligence, as a meaning content that can be inferred from an environment context is identified, whereby objects identified as having a meaning content that can be inferred from an environment context are identified as irrelevant or excluded as an illuminated object. In the context of the present invention, it was found that specific objects in the surroundings of a motor vehicle do not have to be perceived explicitly for the driver to receive the information that is associated with their meaning content. Objects of this type are therefore objects which are not looked at, but whose meaning is detected on the basis of the surroundings. For example, a location sign does not necessarily have to be viewed in order to detect that you are in an inner-city region, but it is also conceivable that this can also be concluded by looking at the surroundings (houses, gardens, sidewalks, . . . ). In this respect, it is not inevitably important for a driver to actually, and explicitly, and consciously notice this traffic sign. It can therefore be provided within the scope of the present invention that no action is taken if these objects are not detected. Such objects can be detected, for example, on the basis of a context algorithm of artificial intelligence that has been trained using suitable training data.

In the context of the present invention, it is also particularly preferred if, for each illuminated object after the illumination, by comparing the position of the illuminated object with directions of fixation determined from the sensor data of the driver sensor, it is determined whether the illuminated object was detected by the driver, where a warning measure is taken at least if an illuminated object is not detected. This means that during and/or after briefly illuminating the illuminated objects, the fusion of the gaze and object detection checks again whether the driver is looking at the corresponding at least one illuminated object. This means that it is advantageously monitored in this embodiment whether the tagging of the illuminated objects was successful and has led to a corresponding conscious perception of the objects by the driver. If it is determined that this is not the case, appropriate measures can be taken to warn the driver and/or the surroundings, in particular other road users. A further increase in security is achieved in this way.

Specifically, in this context it can be provided, for example, that a warning that is perceptible from outside the motor vehicle is output to other road users as a warning measure via the at leak one headlight and/or via at least one in particular acoustic or optical output means of the motor vehicle. It can be concretely provided that the warning indicates the undetected illuminated object and/or includes a warning symbol to be projected by the at least one headlight. If it is ascertained thereby that the illuminated object was not detected by the driver despite the illumination, the instruction can be transmitted to the headlight control unit by means of the at least one headlight preferably using warning symbols relating to the illuminated object to warn the outside that specific illuminated objects, for example pedestrians and the like, were not detected. Such warning symbols can already be displayed with existing high-resolution headlight systems. In addition, further output means can be used to transmit further types of warnings, for example acoustically, to other motor vehicle-external road users.

With regard to these externally perceptible warnings, it should also be pointed out that they can also be used very advantageously if, for example, it is evident from the available response time already mentioned that this is not sufficient to draw the driver's attention to the corresponding illuminated object and to offer the latter time for an adequate reaction. In other words, it can be provided that if an undetected object of the second object list was not chosen as the illuminated object due to an insufficiently determined available reaction time and a warning condition indicating a high level of criticality is possibly met, a warning that is perceptible outside the motor vehicle is output to other road users as a warning measure via the at least one headlight and/or at least one, in particular acoustic or optical output means of the motor vehicle, where the warning displays in particular the undetected object for which a too short of a response time was determined and/or includes a warning symbol to be projected by the at least one headlight. In this way, if the driver's attention and reaction no longer appear to be possible in a timely manner, safety can be increased at least with regard to other road users and a critical situation can nevertheless be avoided, for example.

With regard to the warning measure relating to an undetected illuminated object, it can further be provided that the driver receives a warning measure, in particular at least partially acoustically. Thus, even if the driver himself does not consciously perceive or detect the illuminated object, he can also be warned to generally pay more attention because a critical traffic situation could exist.

In addition to the method, the invention also relates to a motor vehicle comprising a driver assistance system for assisting a driver of the motor vehicle in a traffic situation with regard to objects relevant to the traffic situation, where the driver assistance system has a control device designed to carry out the method according to the invention, where the motor vehicle further includes at least one environment sensor directed towards the forefield of the motor vehicle, the at least one driver sensor designed to detect the line of sight and fixation of the driver's eyes, and the at least one headlight having a controllably variable spatial illumination pattern. All statements relating to the method according to the invention can be transferred analogously to the motor vehicle according to the invention, such that the advantages already mentioned can also be obtained with this. In particular, the driver assistance system described here can also be referred to as an assisting system.

Further advantages and details of the present invention will become apparent from the exemplary embodiments described below and with reference to the drawings. In the drawings:

FIG. 1 shows a schematic flow chart to explain the method according to the invention, FIG. 2 shows a schematic drawing for illuminating an illuminated object, and FIG. 3 shows a schematic diagram of a motor vehicle according to the invention.

An exemplary embodiment of the method according to the invention is to be illustrated below with reference to FIG. 1. The method according to the invention is used in the operation of a motor vehicle by a driver and serves to assist the same in traffic situations with regard to objects relevant to the current traffic situation.

For this purpose, in step S1 an object detection system with at least one, usually a plurality of, environment sensors directed towards the forefield of the motor vehicle is used to create a first object list with objects, where a relevance criterion is expediently already used in step S1 to check whether the respective selected object is to be assessed as relevant for the traffic situation. This means that ideally the first object list only contains objects relevant to the current traffic situation, while other detected objects have already been discarded. Radar sensors, cameras, lidar sensors, laser scanners, ultrasound sensors, and the like can be used as environment sensors. The detection of the objects and the determination of object data to be discussed in more detail below are preferably carried out as part of an information fusion, which in particular includes a sensor data fusion. This information fusion can in particular also include communication information obtained, for example, via motor vehicle-to-motor vehicle communication, which can also be understood as a further environment sensor. Information from map data of a navigation system of the motor vehicle can also be received here.

Detected objects are classified and located, which means that the type of object (for example traffic sign, pedestrian, . . . ) is determined as well as the position at which the object is located, particularly in a coordinate system used in the motor vehicle. Dynamic data of the objects are also determined as further object data, for example whether it is a static or dynamic object, how high its speed and/or acceleration are, and the like. Of course, further object data can also be collected. Object data can of course also be evaluated using the relevance criterion.

A special type of object data, which can expediently be determined for at least some of the objects, is meaning information, for example the meaning content of a traffic sign and the like.

The result of step S1 is therefore a first object list which contains detected objects with associated object data which are relevant to the current traffic situation. In this context, it should also be pointed out that the characterization of the current traffic situation, in particular by means of traffic situation data, can take place continuously in parallel in a step S2. To determine traffic situation data, map material of the navigation system present in particular in the motor vehicle can be used, in the present case supplemented by current dynamic data of the motor vehicle and current environment condition information.

As already mentioned, traffic situation data determined in this way in step S2 can be included in the relevance criterion, in particular in addition to object data, in order to determine the relevance of a detected object.

In a step S3, a gaze detection system is used in the context of the present invention, which is based on the sensor data of at least one driver sensor, for example an eye tracker and/or a driver observation camera. However, not only the driver's current field of vision is determined, but the sensor data of the at least one driver sensor are also evaluated to determine whether there is a short-term fixation that indicates that an object was actually consciously perceived, and thus detected. The corresponding directions of fixation within a sliding time window are kept as a list of fixation directions. An evaluation algorithm of artificial intelligence can expediently be used in the context of this evaluation. The length of the sliding time window can be, for example, 5 to 15 seconds.

The results of steps S1 and S3, i.e. the first object list having objects relevant to the current traffic situation and the fixation direction list, are brought together and compared in a step S4 in order to determine whether relevant objects of the first object list exist for which no associated direction of fixation is found which were therefore not detected by the driver. If there are no relevant, undetected objects, the second object list is thus empty; therefore no further measures are required. However, if there are such undetected objects, the process continues with step S5. In step S5, a notification condition for the undetected objects of the second object list is evaluated, where the notification condition, generally speaking, checks whether it is sensible and/or necessary to draw the attention of the driver in a targeted manner to the specific undetected object in the case of a specific undetected object of the second object list in the current traffic situation. Undetected objects for which the notification condition is met are referred to below as illuminated objects. In this context, an analysis algorithm of artificial intelligence is expediently used. In other words, machine learning models can decide in step S5 which undetected objects are to be illuminated by the headlights of the motor vehicle to emphasize them for the driver. In addition to the traffic situation data of step S2 describing the current traffic situation and the object data of an undetected object examined, the decision is also based on a reaction time which describes whether the driver can be made aware of the undetected object and react until a critical situation arises. This available reaction time is determined depending on the complexity of the traffic situation, and/or a speed of the motor vehicle and/or at least one object. If it is determined that the available reaction time for an object is not sufficient to illuminate it and to wait for a reaction from the driver, and if a warning condition for this object is also met, e.g. if there is a high risk of collision or another risk, a warning measure can be taken to inform other road users of the impending danger with regard to this undetected object.

A result obtained in the context of the notification condition is expediently a priority information, at least with regard to the illuminated objects. If a plurality of illuminated objects are determined, the priority information can be used to determine the illumination sequence.

It should also be noted that historical information, which was determined by the assisting system described here, can also be used either with regard to the relevance criterion or with regard to the notification condition, so that, for example, during repeated trips along the same route, static objects that have already been repeatedly consciously perceived by the driver, that is, detected, can be assumed to be known to the driver, unless an additional condition is met if there is a particularly high level of criticality with regard to this known object. Within the context of the relevance criterion and/or within the scope of the evaluation of the notification condition, a context algorithm of artificial intelligence is also used in the exemplary embodiment described here, which evaluates objects of the object list to be evaluated in such a way that those objects which have a meaning content which can be inferred from an environment context are identified. Such objects can be classified as irrelevant and/or excluded as illuminated objects. Such objects are, for example, city signs, since the fact that you are in the city can easily be determined by the driver by looking at the other surroundings.

If one or more illuminated objects were found in step S5 on the basis of the notification condition, the process continues with step S6. In step S6, the headlights already mentioned, which are so-called high-resolution headlights, the spatial illumination pattern of which can be changed, for example pixel by pixel, are activated to tag the illuminated object. For this purpose it is provided in the present exemplary embodiment that, for example within a period of 0.5 to 1.5 seconds, a triple illumination occurs quickly with high light intensity, and consequently a flashing occurs. Care is taken to ensure that other road users are not dazzled and/or that other road users are not too severely disturbed. If there are a plurality of illuminated objects, they are illuminated in succession in such a way that the driver can concentrate on a specific illuminated object each time.

Since such high-resolution headlight systems are basically known in the prior art, they need not be explained in more detail here.

The driver's directions of fixation are also further monitored and determined during the illumination process. This makes it possible to determine in a step S7 by comparing the position of the illuminated object with these directions of fixation whether the illuminated object has now been detected by the driver, so that he can accordingly integrate it into his vehicle guidance accordingly. If it is determined for at least one illuminated object that the driver has still not noticed it, a plurality of warning measures are carried out in a step S8. On the one hand, warning information which is perceptible from outside the motor vehicle is output to other road users via the front headlights and, if appropriate, a further acoustic or optical output means of the motor vehicle, for example a warning symbol is projected onto the ground via the headlights, this warning symbol preferably indicating the still undetected illuminated object. At the same time, as a warning measure within the motor vehicle, the driver can be warned, preferably at least partially acoustically.

FIG. 2 shows the illumination performed using the example of a traffic situation 1 in more detail. As can be seen, a motor vehicle 2 according to the invention is currently driving on a road 3, where various objects 4 are detectable in the forefield, for example an obstacle 5 and a pedestrian 6. The motor vehicle 2 drives straight ahead towards the pedestrian 6 who is moving on the road 3. If the driver has not consciously perceived the pedestrian 6, and therefore has not detected him, the pedestrian is identified as an illuminated object and is illuminated by means of at least one of the headlights 7 by controlling corresponding pixels such that the pedestrian 6 is not dazzled, cf. beam of light 8.

FIG. 3 finally shows a schematic diagram of a motor vehicle 2 according to the invention. As already shown in FIG. 2, this includes, as part of the high-resolution headlight system, the front headlights 7, which can be controlled, for example, by means of a headlight control unit 9. As part of the object detection system, the motor vehicle 2 also has various environment sensors 10, of which two radar sensors 11 and a camera 12 are shown here by way of example. Further sensors of the motor vehicle 1 include driver sensors 13, in the present exemplary embodiment a driver observation camera 14 and an eye tracker 15. A driver assistance system or assisting system 16 includes a control device 17, which can be at least one control unit, for example, and which is designed to carry out the method according to the invention. The control device 17 executes in particular an object detection system and a line of sight direction detection system.

The invention claimed is:

1. A method for assisting a driver of a motor vehicle in a traffic situation with regard to objects relevant to the traffic situation, the method comprising:
    detecting the objects in a forefield of the motor vehicle using sensor data of at least one environment sensor to determine a first object list having object data associated with the detected objects, wherein the motor vehicle comprises the at least one environment sensor directed towards the forefield of the motor vehicle, at least one driver sensor configured to detect a line of sight and fixation of eyes of the driver, and at least one headlight having a controllably variable spatial illumination pattern;
    determining objects detected by the driver and objects undetected by the driver by comparing the first object list with directions of fixation determined from sensor data of the at least one driver sensor to generate a second object list of undetected objects; and
    in response to a notification condition for at least one illuminated object in the second object list being met, illuminating the at least one illuminated object in a targeted manner using the at least one headlight to notify the driver about the at least one illuminated object.

2. The method according to claim 1, wherein a list of the directions of fixation is kept over a sliding time window.

3. The method according to claim 1, further comprising:
    applying a relevance criterion, which classifies the objects as relevant or not relevant to the traffic situation, to the objects of the first object list; and
    using only objects classified as relevant for the determination of the second object list or relevant for the determination of the at least one illuminated object.

4. The method according to claim 3, wherein the applying the relevance criterion comprises applying the relevance criterion using artificial intelligence.

5. The method according to claim 1, further comprising:
    determining, for at least some of the undetected objects of the second object list, priority information relating to the traffic situation by using traffic situation data describing the traffic situation and the respective object data; and
    using the notification condition to evaluate the priority information.

6. The method according to claim 5, further comprising:
    for a plurality of illuminated objects, determining an illumination sequence as a function of the priority information; and
    illuminating the objects of the second object list according to the illumination sequence.

7. The method according to claim 6, wherein the illuminating according to the illumination sequence comprises illuminating the objects of the second object list for a predetermined time period or intermittently.

8. The method according to claim 1, further comprising:
    using an analysis algorithm of artificial intelligence to evaluate the notification condition to determine priority information.

9. The method according to claim 1, further comprising:
    using the notification condition to evaluate traffic situation data describing the traffic situation.

10. The method according to claim 9, wherein the traffic situation data describing the traffic situation comprises at least one of a complexity of the traffic situation, at least one hazard potential of at least one of the undetected objects, or the object data of the undetected objects.

11. The method according to claim 1, further comprising:
    determining at least one of a reaction situation or object-related, available response time using the notification condition; and
    evaluating at least one of the reaction situation or the object-related, available response time.

12. The method according to claim 11, wherein the reaction situation or the object-related, available response time is determined using at least one of a complexity of the traffic situation, a speed of the motor vehicle, or at least one object.

13. The method according to claim 1, further comprising:
    evaluating at least one object of the first object list based on historical information describing a viewing of at least one static object of the objects in a journey of a current route of the motor vehicle,
    wherein the at least one static object is identified by the driver as known or as unknown to the driver, and
    wherein the evaluating the at least one object is part of an evaluation of a relevance criterion or is part of an evaluation of the notification condition; and
    classifying the at least one static object identified as known to the driver as irrelevant or excluded as an illuminated object.

14. The method according to claim 13, wherein history information associated with the at least one static object identified by the driver as known or as unknown to the driver is determined using history data from past determinations of the second object list or using machine learning.

15. The method according to claim 1, further comprising:
    for evaluating a relevance criterion or for evaluating the notification condition, evaluating at least one object of the first object list using a context algorithm as a meaning content inferred from an environment context,
    wherein an object identified as having the meaning content inferred from the environment context is identified as irrelevant or excluded as an illuminated object.

16. The method according to claim 1, further comprising:
    for each illuminated object after the illumination, determining whether the illuminated object was detected by the driver by comparing the position of the illuminated object with the directions of fixation determined from the sensor data of the at least one driver sensor; and
    generating a warning measure in response to the illuminated object not being detected.

17. The method according to claim 16, further comprising:
    outputting the warning measure, which is perceptible from outside of the motor vehicle, to other road users as a warning measure via at least one of a headlight, an acoustic output of the motor vehicle, or an optical output of the motor vehicle.

18. The method according to claim 17, wherein the warning measure indicates the undetected illuminated object or comprises a warning symbol to be projected by the headlight.

19. The method according to claim 16, wherein the driver is warned by the warning measure at least partially acoustically.

20. A motor vehicle, comprising:
    at least one environment sensor directed towards a forefield of the motor vehicle;

at least one driver sensor configured to detect a line of sight and fixation of eyes of a driver of the motor vehicle;

at least one headlight having a controllably variable spatial illumination pattern; and a driver assistance system configured to assist the driver of the motor vehicle in a traffic situation with regard to objects relevant to the traffic situation, wherein the driver assistance system comprises a control device configured to:

detect the objects in the forefield of the motor vehicle using sensor data of the at least one environment sensor to determine a first object list having object data associated with the detected objects;

determine objects detected by the driver and objects undetected by the driver by comparing the first object list with directions of fixation determined from sensor data of the at least one driver sensor to generate a second object list of undetected objects; and in response to a notification condition for at least one illuminated object in the second object list being met, illuminate the at least one illuminated object in a targeted manner using the at least one headlight to notify the driver about the at least one illuminated object.

\* \* \* \* \*